US012389340B2

(12) United States Patent
Mukherjee et al.

(10) Patent No.: US 12,389,340 B2
(45) Date of Patent: Aug. 12, 2025

(54) SYSTEMS, METHODS, AND DEVICES FOR TRANSMISSION RATE-BASED COEXISTENCE ENHANCEMENT IN WIRELESS DEVICES (71) Applicant: Cypress Semiconductor Corporation, San Jose, CA (US)

(72) Inventors: Suprojit Mukherjee, Nadia (IN); Munukutla Sandeep Sarma, Bangalore (IN); Raghavendra Kencharla, Bangalore (IN); Ayush Sood, Bengaluru (IN)

(73) Assignee: Cypress Semiconductor Corporation, San Jose, CA (US)

( * ) Notice: Subject to any disclaimer, the term of this patent is extended or adjusted under 35 U.S.C. 154(b) by 437 days.

(21) Appl. No.: 18/074,304

(22) Filed: Dec. 2, 2022

(65) Prior Publication Data

US 2024/0187999 A1    Jun. 6, 2024

(51) Int. Cl.
H04W 52/26 (2009.01)
H04W 52/24 (2009.01)

(52) U.S. Cl.
CPC ....... H04W 52/262 (2013.01); H04W 52/241 (2013.01)

(58) Field of Classification Search
CPC ... H04W 52/26; H04W 52/262; H04W 52/24; H04W 52/241; H04L 1/0026; H04L 1/0029
See application file for complete search history.

(56) References Cited

U.S. PATENT DOCUMENTS

| | | | | |
|---|---|---|---|---|
| 6,802,035 | B2* | 10/2004 | Catreux | H04L 1/06 714/704 |
| 8,532,081 | B1* | 9/2013 | Narasimhan | H04L 1/0001 455/452.2 |
| 8,929,331 | B2* | 1/2015 | Karaoguz | H04W 84/045 370/331 |
| 9,060,311 | B2* | 6/2015 | Karaoguz | H04W 36/0016 |
| 9,398,480 | B2* | 7/2016 | Siomina | H04L 1/0026 |
| 9,420,224 | B2* | 8/2016 | Fay | H04N 21/44209 |
| 9,673,960 | B2* | 6/2017 | Eltawil | H04L 5/1461 |
| 9,699,119 | B2* | 7/2017 | Hiremath | H04W 72/02 |
| 9,941,928 | B2* | 4/2018 | Cioffi | H04L 5/1438 |
| 10,034,329 | B2* | 7/2018 | Jechoux | H04W 72/541 |
| 10,420,023 | B2* | 9/2019 | Ramasamy | H04W 52/288 |
| 10,708,887 | B1* | 7/2020 | Evans | H04W 72/02 |
| 11,005,549 | B2* | 5/2021 | Hosseini | H04L 1/0004 |
| 11,102,719 | B2* | 8/2021 | Ramasamy | H04W 52/367 |
| 11,240,759 | B2* | 2/2022 | Andgart | H04W 52/143 |
| 11,627,476 | B2* | 4/2023 | Zhu | H04B 7/088 370/329 |

(Continued)

Primary Examiner — Hai V Nguyen (57) ABSTRACT

Systems, methods, and devices enhance performance of collocated transceivers in wireless devices. Methods include determining, using a processing device comprising processing elements, a transmit power for a first transceiver of a wireless device, and determining, using the processing device, a coding rate for a second transceiver of the wireless device based, at least in part, on the determined transmit power, the first transceiver being collocated with the second transceiver. Methods also include determining, using the processing device, a transmission rate for the second transceiver based, at least in part, on the determined coding rate.

20 Claims, 7 Drawing Sheets

(56) References Cited

U.S. PATENT DOCUMENTS

| | | | |
|---|---|---|---|
| 11,637,613 B1* | 4/2023 | Learned | H04J 11/0036 369/44.28 |
| 11,678,327 B2* | 6/2023 | Park | H04W 72/21 370/329 |
| 12,027,780 B2* | 7/2024 | Tran | G06V 10/764 |
| 12,200,682 B2* | 1/2025 | Sarma | H04W 72/54 |
| 12,256,436 B2* | 3/2025 | Zhang | H04W 52/146 |
| 12,262,216 B2* | 3/2025 | Khalid | H04W 80/02 |
| 2010/0177707 A1* | 7/2010 | Essinger | H04W 52/241 370/329 |
| 2010/0296487 A1* | 11/2010 | Karaoguz | H04W 36/04 370/332 |
| 2011/0019639 A1* | 1/2011 | Karaoguz | H04W 36/0016 370/331 |
| 2013/0165134 A1* | 6/2013 | Touag | H04W 16/14 455/452.1 |
| 2013/0295989 A1* | 11/2013 | Smadi | H04W 16/14 455/553.1 |
| 2014/0126403 A1* | 5/2014 | Siomina | H04J 11/005 370/252 |
| 2014/0128115 A1* | 5/2014 | Siomina | H04L 1/0026 455/501 |
| 2014/0369480 A1* | 12/2014 | Cioffi | H04B 3/32 379/93.01 |
| 2015/0222326 A1* | 8/2015 | Cioffi | H04B 3/32 370/201 |
| 2015/0358873 A1* | 12/2015 | Karaoguz | H04W 36/22 370/331 |
| 2017/0093197 A1* | 3/2017 | Gao | H04W 52/241 |
| 2019/0036585 A1* | 1/2019 | Hosseini | H04L 1/1861 |
| 2019/0090200 A1* | 3/2019 | Alpert | H04W 52/146 |
| 2019/0215765 A1* | 7/2019 | Ramasamy | H04W 52/243 |
| 2020/0015161 A1* | 1/2020 | Ramasamy | H01Q 1/2291 |
| 2020/0366324 A1* | 11/2020 | Hong | H04B 17/318 |
| 2020/0396695 A1* | 12/2020 | Bhushan | H04B 17/336 |
| 2021/0045064 A1* | 2/2021 | Andgart | H04W 52/143 |
| 2021/0051653 A1* | 2/2021 | Park | H04W 8/22 |
| 2021/0067209 A1* | 3/2021 | Gopal | H04W 72/0446 |
| 2021/0099329 A1* | 4/2021 | Hellfajer | H04L 27/2657 |
| 2021/0250940 A1* | 8/2021 | Raghavan | H04B 7/0695 |
| 2022/0131630 A1* | 4/2022 | Ghozlan | H04L 5/0073 |
| 2022/0167176 A1* | 5/2022 | Khalid | H04W 72/0453 |
| 2022/0183037 A1* | 6/2022 | Smith | H04W 74/0808 |
| 2022/0255778 A1* | 8/2022 | Paz | H04B 7/0632 |
| 2022/0408286 A1* | 12/2022 | Kumar | H04W 52/10 |
| 2023/0189163 A1* | 6/2023 | Ren | H04W 52/242 370/318 |
| 2023/0309084 A1* | 9/2023 | Sarma | H04W 72/1215 |
| 2023/0413270 A1* | 12/2023 | Park | H04W 76/14 |
| 2024/0125887 A1* | 4/2024 | Amiri | H04W 24/08 |
| 2024/0276279 A1* | 8/2024 | Haustein | H04W 24/10 |
| 2024/0323711 A1* | 9/2024 | Li | H04B 17/17 |
| 2024/0406910 A1* | 12/2024 | Manolakos | H04W 64/00 |
| 2025/0055585 A1* | 2/2025 | Ren | H04B 17/346 |

* cited by examiner

SYSTEMS, METHODS, AND DEVICES FOR TRANSMISSION RATE-BASED COEXISTENCE ENHANCEMENT IN WIRELESS DEVICES

TECHNICAL FIELD

This disclosure generally relates to wireless devices, and more specifically, to enhancement of coexistence of transceivers in such wireless devices.

BACKGROUND

Wireless devices may communicate with each other via one or more wireless modalities, such as a Wi-Fi connection or a Bluetooth connection. Accordingly, such wireless communication may be implemented in a manner compliant with a wireless protocol. Moreover, such wireless devices may include various hardware components to facilitate such communication. For example, wireless devices may include transmission media that may include one or more antennas. Conventional techniques for handling activity of collocated wireless radios remain limited because they are not able to efficiently provide proper isolation between collocated radios while maintaining transmit power and throughput performance.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Wireless devices may include multiple transceivers that are collocated. More specifically, they may be included in the same wireless device, and may share one or more components of the wireless device, such as components of processing logic as well as components of a communications medium, such as an antenna. Accordingly, coexistence techniques are used to manage shared access to such resources. In one example, the wireless devices may be low energy devices using low energy and/or cost-efficient components. Accordingly, wireless devices may be low isolation devices that allow power leakage between collocated transceivers and signal corruption. Thus, conventional techniques for implementing collocated transceivers in low energy devices remain limited because they are not able to efficiently provide isolation between collocated transceivers while maintaining a relatively high data throughput.

Embodiments disclosed herein provide the ability to dynamically determine transmit power levels and transmission packet rates to improve coexistence performance of collocated transceivers. As will be discussed in greater detail below, a transmit power may be determined for a first transceiver. Moreover, the selected transmit power may be used in combination with a signal strength and noise metrics to dynamically select a transmission rate for a second transceiver that is collocated with the first transceiver. Moreover, switching operations may be configured and performed to selectively isolate the second transceiver from the first transceiver. Accordingly, as will be discussed in greater detail below, configurations of and isolation between first and second collocated transceivers may be dynamically managed to improve coexistence performance of collocated transceivers.

Figure 1:
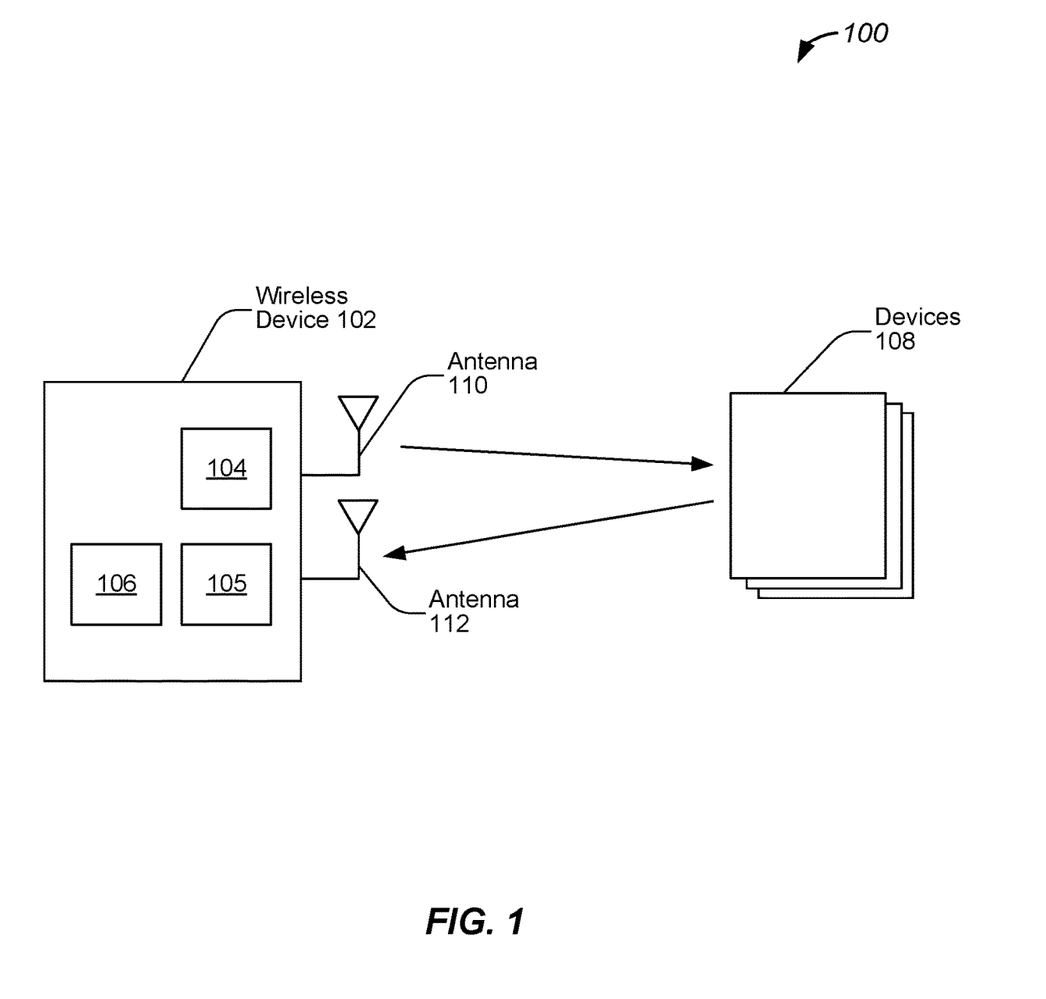
FIG. 1 illustrates an example of a system for coexistence enhancement, configured in accordance with some embodiments.

FIG. 1 illustrates an example of a system for coexistence enhancement, configured in accordance with some embodiments. Accordingly, a system, such as system 100, may include wireless devices that are used for wireless communications, and are also configured to be able to perform coexistence and interference reduction operations as disclosed herein. Accordingly, as will be discussed in greater detail below, wireless devices included in system 100 may be configured to dynamically determine transmit power levels and transmission packet rates to improve coexistence performance of collocated transceivers.

In various embodiments, system 100 may include wireless device 102 which may be a wireless communications device. As discussed above, such wireless devices may be compatible with one or more wireless transmission protocols, such as a Wi-Fi protocol, a Bluetooth protocol, a near field communications (NFC) protocol, a Zigbee protocol, or an ultra-wideband (UWB) protocol. Accordingly, while examples disclosed herein are described with reference to Wi-Fi and Bluetooth protocols, any suitable wireless transmission protocols may be used. In some embodiments, wireless device 102 includes collocated radios. For example, wireless device 102 may include a Wi-Fi radio and a Bluetooth radio that share access to a communications medium. In one example, are Bluetooth devices. For example, wireless device 102 may include a first transceiver, such as transceiver 104, and a second transceiver, such as transceiver 105. Transceiver 104 may be compatible with a Wi-Fi specification and protocol, and transceiver 105 may be compatible with a Bluetooth specification and protocol. For example, the Bluetooth protocol may be a Bluetooth Low Energy (BLE) protocol, also referred to as Bluetooth Smart. In some embodiments, wireless device 102 may be a smart device, such as those found in wearable devices, or may be a monitoring device, such as those found in smart buildings, environmental monitoring, and energy management. It will be appreciated that such wireless devices may be any suitable device, such as those found in cars, other vehicles, and even medical implants.

As shown in FIG. 1, various wireless communications devices may be in communication with each other via one or more wireless communications mediums. More specifically, wireless device 102 may include one or more antennas, such as antenna 110 and antenna 112, and may also include processing device 106. As discussed above, wireless device 102 may also include collocated transceivers, such as transceiver 104 and transceiver 105. As disclosed herein a transceiver as well as its associated transmit and receive chains and processing logic may be referred to as a radio. As will be discussed in greater detail below, such processing devices, transceivers, and radios may be configured to establish communications connections with other devices, and transmit data in the form of data packets via such communications connections. Accordingly, wireless devices, such as wireless device 102, are configured to dynamically determine transmit power levels and transmission packet rates to improve coexistence performance of collocated transceivers, such as transceiver 104 and transceiver 105.

In some embodiments, system 100 may further include devices 108 which may also be wireless devices. As similarly discussed above, devices 108 may be compatible with one or more wireless transmission protocols, such as a Wi-Fi protocol or a Bluetooth protocol. In some embodiments, devices 108 may be configured as stations in communication with wireless device 102. For example, devices 108 may be smart devices or other devices, such as those found in gaming systems, cars, other vehicles, and medical implants. In some embodiments, devices 108 may be access points, or software enabled access points (SoftAP). In various embodiments, devices 108 may be different types of devices than wireless device 102. As discussed above, each of devices 108 may include one or more antennas, as well as processing devices and transceivers, which may also be configured to establish communications connections with other devices, and transmit data in the form of data packets via such communications connections. As discussed above, devices 108 may also be configured to dynamically determine transmit power levels and transmission packet rates.

Figure 2:
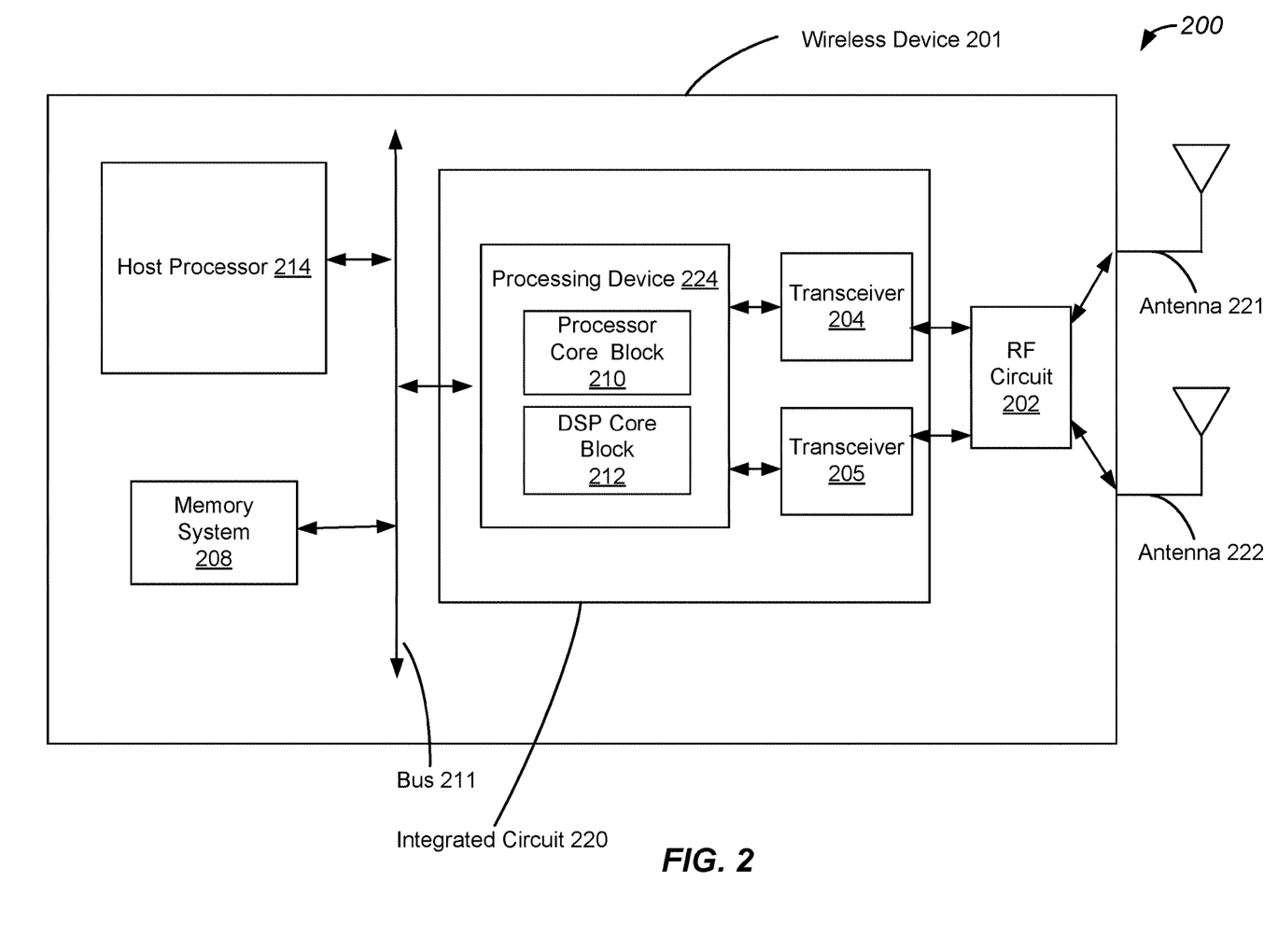
FIG. 2 illustrates an example of a device for coexistence enhancement, configured in accordance with some embodiments.

FIG. 2 illustrates an example of a device for coexistence enhancement, configured in accordance with some embodiments. More specifically, FIG. 2 illustrates an example of a system, such as system 200, that includes wireless device 201. It will be appreciated that wireless device 201 may be one of any of the wireless devices discussed above with reference to FIG. 1, such as wireless device 102 and devices 108.

In various embodiments, wireless device 201 includes one or more transceivers, such as transceiver 204 and transceiver 205. In one example, system 200 includes transceiver 204 which is configured to transmit and receive signals using a communications medium that may include antenna 221 or antenna 222. As noted above, transceiver 204 may be a Wi-Fi transceiver. Accordingly, transceiver 204 may be compatible with a Wi-Fi communications protocol, such as an 802.11ax protocol. It will be appreciated that while the 802.11ax protocol is provided as an example, any suitable wireless transmission protocol may be used. Accordingly, transceiver 204 may be compatible with various other Wi-Fi protocols, or any other suitable wireless transmission protocol capable of implementing the techniques disclosed herein. In various embodiments, transceiver 204 includes a modulator and demodulator as well as one or more buffers and filters, that are configured to generate and receive signals via antenna 221 and/or antenna 222.

System 200 additionally includes transceiver 205 which may be collocated with transceiver 204 in wireless device 201. In various embodiments, transceiver 205 is also be configured to transmit and receive signals using a communications medium that may include antenna 221 or antenna 222. Accordingly, transceiver 205 may be a Bluetooth transceiver compatible with a Bluetooth communications protocol. In one example, the Bluetooth protocol may be a Bluetooth Low Energy (BLE) protocol. Moreover, transceiver 205 includes a modulator and demodulator as well as one or more buffers and filters, that are configured to generate and receive signals via antenna 221 and/or antenna 222. While various embodiments are described with reference to Bluetooth and Wi-Fi communications protocols, it will be appreciated that any suitable protocol may be used.

In various embodiments, system 200 further includes processing device 224 which may include logic implemented using processing elements and/or one or more processor cores. Accordingly, processing device 224 is configured to perform transmit power level and transmission packet rate determination operations, as will be discussed in greater detail below. More specifically, processing elements included in processing device 224 may be configured to implement a packet traffic arbiter that may be configured to perform transmit power level as well as coding rate and transmission rate determination operations as disclosed herein. In some embodiments, the packet traffic arbiter may be implemented in firmware included in processing device 224.

Moreover, processing device 224 includes one or more components configured to implement a medium access control (MAC) layer that is configured to control hardware associated with a wireless transmission medium, such as that associated with a Wi-Fi transmission medium. In one example, processing device 224 may include processor core block 210 that may be configured to implement a driver, such as a Bluetooth and/or Wi-Fi driver. Processing device 224 may further include digital signal processor (DSP) core block 212 which may be configured to include microcode.

In various embodiments, processor core block 210 comprises multiple processor cores which are each configured to implement specific portions of a wireless protocol interface. For example, a Bluetooth protocol may be implemented using a Bluetooth stack in which software is implemented as a stack of layers, and such layers are configured to compartmentalize specific functions utilized to implement the Bluetooth communications protocol. In various embodiments, a host stack includes layers for a Bluetooth network encapsulation protocol, radio frequency communication, service discovery protocol, as well as various other high level data layers. Moreover, a controller stack includes a link management protocol, a host controller interface, a link layer which may be a low energy link layer, as well as various other timing critical layers.

System 200 further includes radio frequency (RF) circuit 202 which is coupled to antenna 221 and antenna 222. In various embodiments, RF circuit 202 may include various components such as an RF switch, a diplexer, and a filter. While FIG. 2 illustrates system 200 as having two antennas, it will be appreciated that system 200 may have a single antenna, or any suitable number of antennas. Accordingly, RF circuit 202 may be configured to select an antenna for transmission/reception, and may be configured to provide coupling between the selected antenna, such as antenna 221, and other components of system 200 via a bus, such as bus 211. As will be discussed in greater detail below, RF circuit 202 and one or more switches included in RF circuit 202 may be configured to perform switching operations to improve isolation of transceivers, reduce leakage between transceivers, and further improve coexistence performance of the transceivers. While one RF circuit is shown, it will be appreciated that wireless device 201 may include multiple RF circuits. Accordingly, each of multiple antennas may have its own RF circuit. Moreover, each one may be associated with a particular wireless communications protocol, such as a first antenna and RF circuit for Wi-Fi and a second antenna and RF circuit for Bluetooth.

System 200 includes memory system 208 which is configured to store one or more data values associated with transmit power level and transmission packet rate determination operations discussed above and in greater detail below. Accordingly, memory system 208 includes storage device, which may be a non-volatile random access memory (NVRAM) configured to store such data values, and may also include a cache that is configured to provide a local cache. In various embodiments, system 200 further includes host processor 214 which is configured to implement processing operations implemented by system 200.

It will be appreciated that one or more of the above-described components may be implemented on a single chip, or on different chips. For example, transceiver 204, transceiver 205, and processing device 224 may be implemented on the same integrated circuit chip, such as integrated circuit chip 220. In another example, transceiver 204, transceiver 205, and processing device 224 may each be implemented on their own chip, and thus may be disposed separately as a multi-chip module or on a common substrate such as a printed circuit board (PCB) or a multi-die chip implemented in the same package. It will also be appreciated that components of system 200 may be implemented in the context of a low energy device, a smart device, or a vehicle such as an automobile. Accordingly, some components, such as integrated chip 220, may be implemented in a first location, while other components, such as antenna 221, may be implemented in second location, and coupling between the two may be implemented via a coupler such as RF circuit 202.

Figure 3:
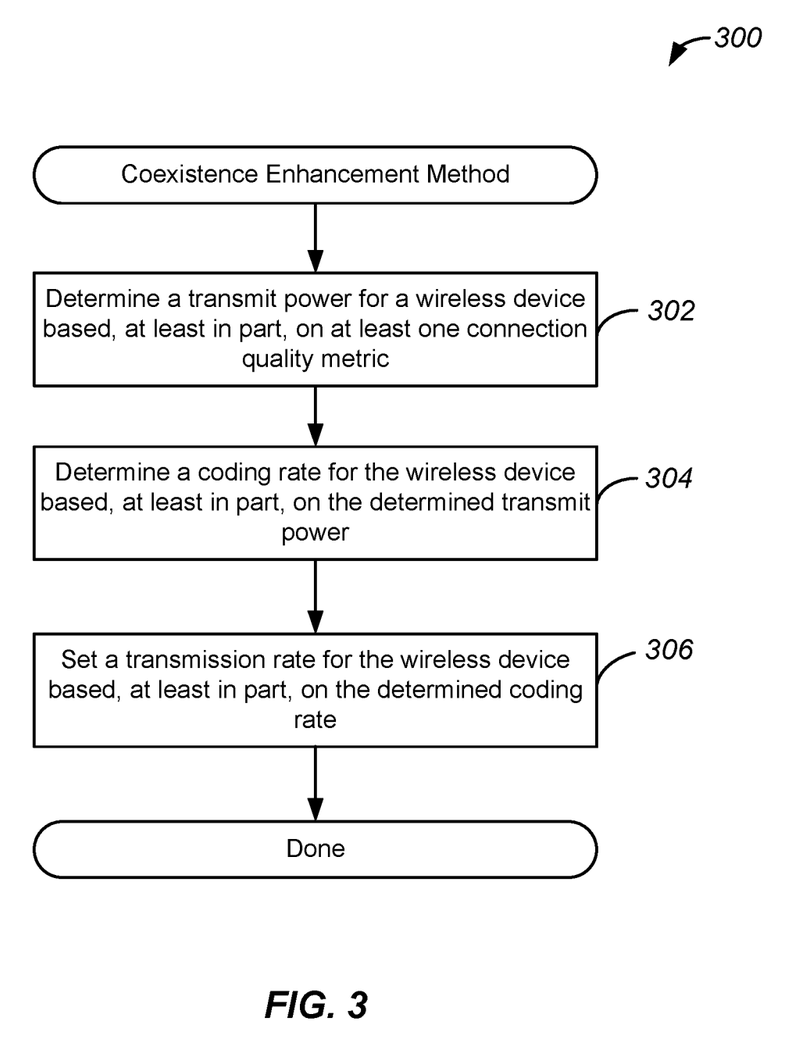
FIG. 3 illustrates an example of a method for coexistence enhancement, performed in accordance with some embodiments.

FIG. 3 illustrates an example of a method for coexistence enhancement, performed in accordance with some embodiments. Accordingly, a method, such as method 300, may be performed to dynamically determine transmit power levels and transmission packet rates for collocated transceivers in wireless devices. As will be discussed in greater detail below, dynamically setting power levels and coding rates improves coexistence performance of such collocated transceivers.

Method 300 may perform operation 302 during which a transmit power may be determined for a wireless device. The transmit power is determined for a first transceiver, and may be determined based, at least in part, on at least one connection quality metric associated with the first transceiver. In some embodiments, the connection quality metric may be a signal strength indicator, such as a received signal strength indicator (RSSI) value determined by one or more components of the wireless device as part of one or more communications link establishment operations. As will be discussed in greater detail below, the transmit power may be determined based on an available power, the connection quality metric, and one or more designated threshold values.

Method 300 may perform operation 304 during which a coding rate may be determined for one or more wireless devices based, at least in part, on the determined transmit power. In various embodiments, the coding rate may be a data transmission rate used by a second transceiver of the wireless device for data packet transmission. As will be discussed in greater detail below, the coding rate may be determined based on one or more noise metrics associated with the second transceiver as well as one or more designated threshold values.

Method 300 may perform operation 306 during which a transmission rate may be set for a wireless device based, at least in part, on the determined coding rate. Accordingly, the coding rate may be transmitted to a wireless device that is a peer device, and the new coding rate may be used as a transmission rate between wireless devices for wireless communication using the second transceiver.

Figure 4:
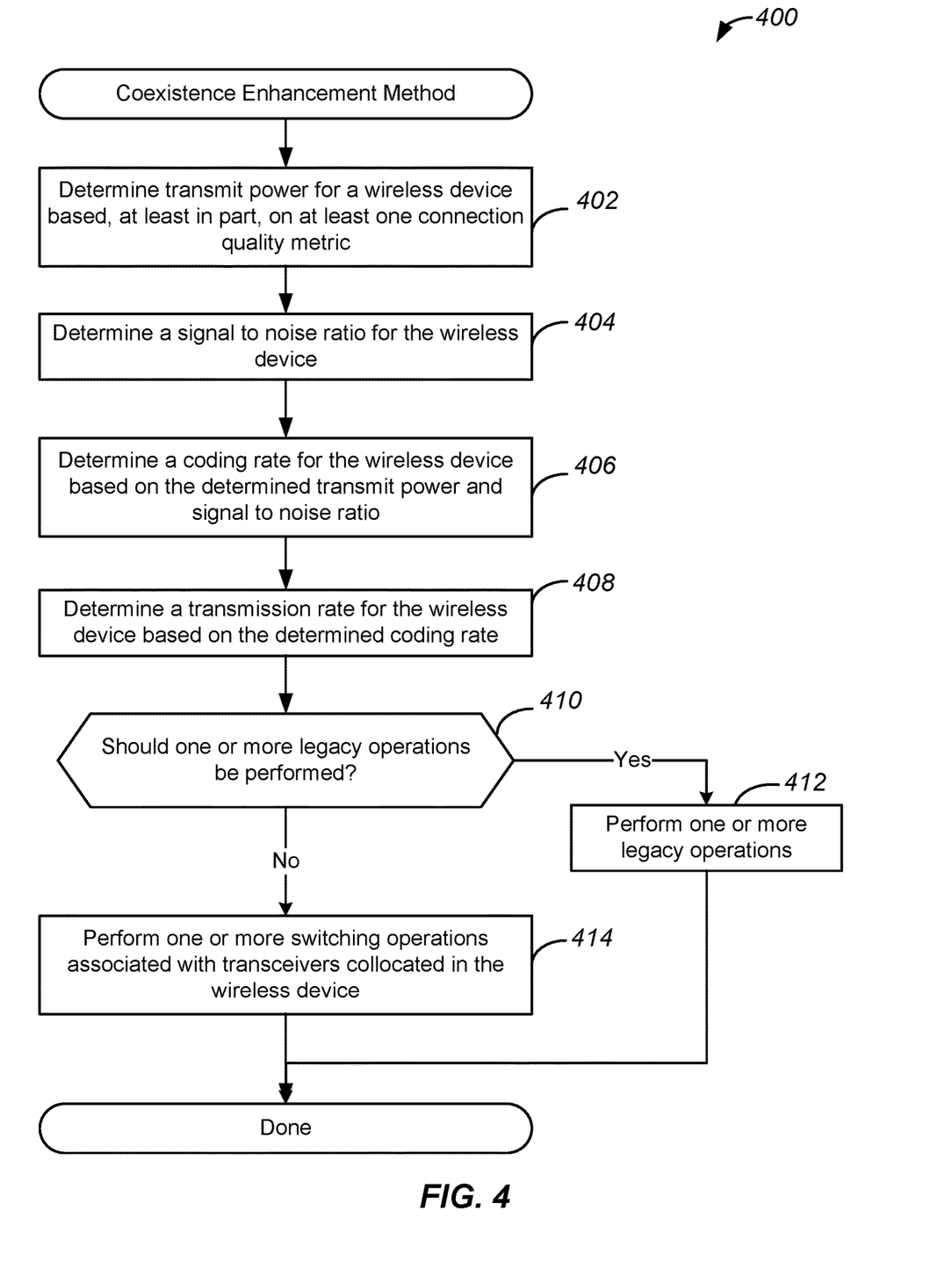
FIG. 4 illustrates another example of a method for coexistence enhancement, performed in accordance with some embodiments.

FIG. 4 illustrates another example of a method for coexistence enhancement, performed in accordance with some embodiments. Accordingly, a method, such as method 400, may be performed to dynamically determine transmit power levels and transmission packet rates for collocated transceivers in wireless devices. As will be discussed in greater detail below, dynamically setting power levels and coding rates improves coexistence performance of such collocated transceivers.

Method 400 may perform operation 402 during which a transmit power may be determined for a wireless device. As similarly discussed above, the transmit power may be determined for a first transceiver, and may be determined based on at least one connection quality metric that may be a signal strength indicator, such as a received signal strength indicator (RSSI) value. As will be discussed in greater detail below with reference to FIG. 5, the transmit power may be determined by using a current transmission rate to determine a power level for the first transceiver, and then to compare the determined power level against minimum and maximum allowed power levels. The result of the comparison may be used as a transmit power for the first transceiver, which may be a Wi-Fi transceiver.

Method 400 may perform operation 404 during which a signal to noise ratio may be determined for the wireless device. As will be discussed in greater detail below with reference to FIG. 6, one or more noise metrics may be used to calculate an effective noise metric for a second transceiver. For example, metrics identifying levels of leakage noise, quantization noise, and thermal noise may be combined to generate an effective noise metric for the second transceiver. As will also be discussed in greater detail below, a signal strength metric may also be determined, and the combination of the signal strength metric the effective noise metric may be used determine a signal to noise ratio for the second transceiver, which may be a Bluetooth transceiver.

Method 400 may perform operation 406 during which a coding rate may be determined for one or more wireless devices based, at least in part, on the determined transmit power and the signal strength to noise ratio. As similarly discussed above, the coding rate may be a data transmission rate used by the second transceiver of the wireless device for data packet transmission. In one example, a coding rate may be defined by a communications standard used by the transceiver. For example, a Bluetooth Low Energy transceiver may be configured to support four coding rates defined as LE 1M, LE 2M, LE S=2, and LE S=8. Accordingly, as will be discussed in greater detail below with reference to FIG. 6, the determined signal to noise ratio may be compared against one or more threshold values to map the determined signal to noise ratio to a particular coding rate for the second transceiver. In some embodiments, such a mapping may have been determined by an entity, such as a manufacturer.

Method 400 may perform operation 408 during which a transmission rate may be determined for a wireless device based, at least in part, on the determined coding rate. Moreover, as similarly discussed above, a data transmission may be sent to one or more peer devices, and the coding rate may be communicated to the peer devices such that the new coding rate is used as a transmission rate between wireless devices for wireless communications that use the second transceiver.

Method 400 may perform operation 410 during which it may be determined if one or more legacy operations should be performed. Such a determination may be made based on one or more designated ranges of rates. More specifically, an entity, such as a manufacturer, may have identified one or more designated ranges of coding rates and/or transmission rates that are permissible. For example, a permissible range of coding rates and transmission rates may be defined by a communications standard, such as a Bluetooth standard. Accordingly, if the determined coding rate and/or transmission rate are outside of the designated range of coding rates and/or transmission rates, legacy techniques may be used. In another example, the determination may be made based on behavior of peer devices. More specifically, if a peer device has not adjusted to the new coding rate and/or transmission rate, then legacy operations may be performed.

Thus, if it is determined that one or more legacy operations should be performed, method 400 may proceed to operation 412 where legacy operations, such as time division multiplexing (TDM) operations, may be utilized for communications operations. If the determined coding rate and/or transmission rate are within the designated range of coding rates and/or transmission rates, method 400 may proceed to operation 414.

Accordingly, during operation 414 one or more switching operations may be performed. As will be discussed in greater detail below with reference to FIG. 7, one or more switches may be configured to improve isolation between collocated transceivers, and reduce leakage from one receiver to another. Accordingly, if the first transceiver, that may be a Wi-Fi transceiver, is about to being a data transmission, an RF circuit may open a switch to disconnect the second transceiver, that may be a Bluetooth transceiver, from an antenna that may be a shared antenna used for communication. In this way, selective coupling of the second transceiver to the shared antenna may improve isolation of the second transceiver by reducing saturation of the front end of the second transceiver, reducing leakage, and better protecting components of the second transceiver.

Figure 5:
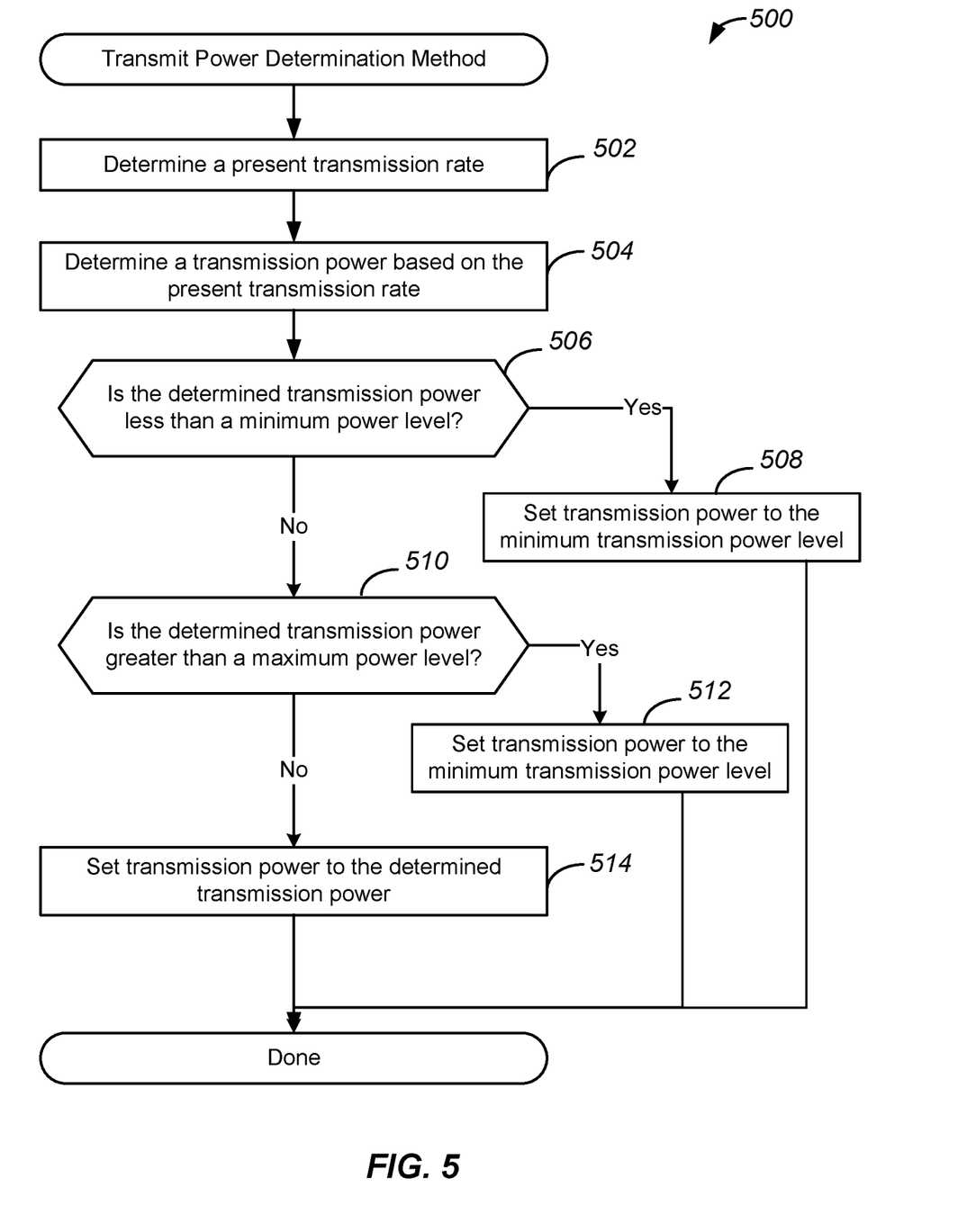
FIG. 5 illustrates an example of a method for transmit power determination, performed in accordance with some embodiments.

FIG. 5 illustrates an example of a method for transmit power determination, performed in accordance with some embodiments. Accordingly, a method, such as method 500, may be performed to dynamically determine a transmit power level for a collocated transceiver in a wireless device. As will be discussed in greater detail below, such power levels may be used to dynamically determine coding rates for transceivers to improve coexistence performance of collocated transceivers.

Method 500 may perform operation 502 during which a present transmission rate may be determined. In various embodiments, the present transmission rate may be determined based on one or more parameters stored in memory. For example, a transmission rate used for a previous data transmission may be identified as a present transmission rate.

Method 500 may perform operation 504 during which an initial transmission power may be determined based on the present transmission rate. Accordingly, a power level used for that transmission rate may also be available. For example, a beacon transmission power may be stored in memory and available based on previous transmission operations. In various embodiments, an equation, such as equation 1 shown below, may be used to determine an initial transmission power.

$$P_i = (P1 - R1) + S_i \quad (1)$$

Accordingly, initial power $P_i$ may be determined by subtracting R1 from P1, where R1 is a signal strength metric, such as a beacon RSSI value, and P1 is power level that may be obtained from a beacon power level used to transmit a previous beacon frame. The result of the subtraction may be added to $S_i$, which may be a minimum sensitivity at rate i as required by a protocol standard. The result $P_i$ may be an initial transmission power used for subsequent determination operations discussed in greater detail below.

Method 500 may perform operation 506 during which if may be determined if the initial transmission power is less than a minimum power level. Such a determination may be made based on a comparison of the transmission power determined during operation 504 to a designated threshold value that may represent a minimum allowed power for the transceiver. Such a threshold value may be determined by an entity, such as a manufacturer, or based on a one or more aspects of a wireless communications protocol specification. If it is determined that the initial transmission power is less than the minimum power level, then method 500 may proceed to operation 508 during which the transmission power may be set to the designated minimum power level which may be the threshold value. If it is determined that the initial transmission power is greater than the minimum power level, method 500 may proceed to operation 510.

Accordingly, during operation 510, it may be determined if the initial transmission power is greater than a maximum power level. Such a determination may be made based on a comparison of the transmission power determined during operation 504 to a designated threshold value that may represent a maximum allowed power for the transceiver. Such a threshold value may be determined by an entity, such as a manufacturer, or based on a one or more aspects of a wireless communications protocol specification. If it is determined that the initial transmission power is greater than the maximum power level, then method 500 may proceed to operation 512 during which the transmission power may be set to a designated maximum power level which may be the threshold value. If it is determined that the initial transmission power is less than the maximum power level, method 500 may proceed to operation 514.

Accordingly, during operation 514, the transmission power may be set based on the determined transmission power. Accordingly, the transmission power determined during operation 504 may be set as a present transmission power, and may be used as a transmission power for the transceiver, as will be discussed in greater detail below with reference to FIG. 6.

Figure 6:
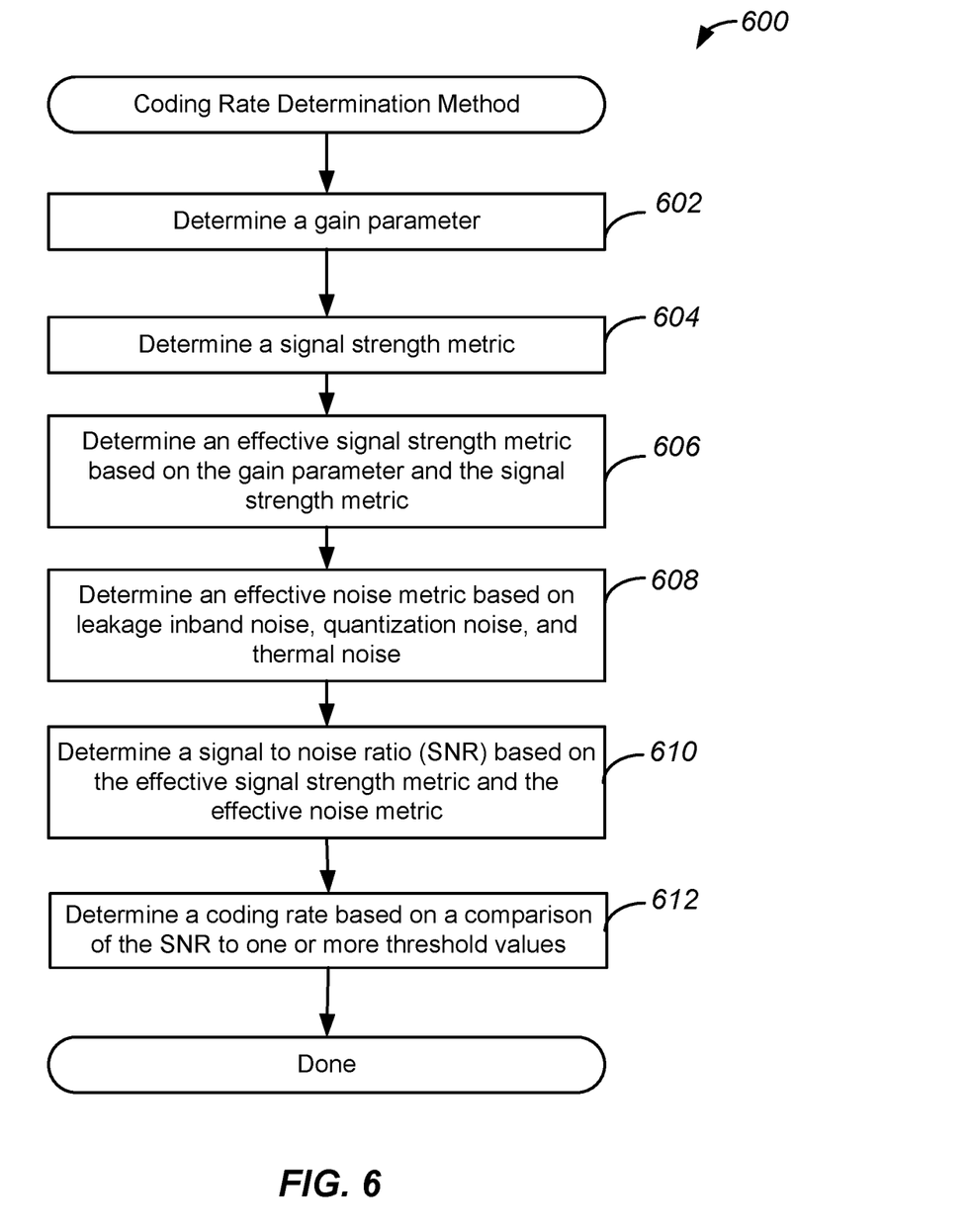
FIG. 6 illustrates an example of a method for coding rate determination, performed in accordance with some embodiments.

FIG. 6 illustrates an example of a method for coding rate determination, performed in accordance with some embodiments. Accordingly, a method, such as method 600, may be performed to dynamically determine a coding rate for a collocated transceiver in a wireless device. As will be discussed in greater detail below, such a coding rate may be selected to improve coexistence performance of collocated transceivers at a given transmit power.

Method 600 may perform operation 602 during which a gain parameter may be determined. In various embodiments, the gain parameter is selected for a front end of a collocated transceiver such that the front end is not saturated by a signal from another collocated transceiver. For example, as discussed above with reference to FIG. 5, a transmit power for a first transceiver, which may be a Wi-Fi transceiver, may have been set. Given the set transmission power, a gain may be selected for the front end of a second transceiver that may be a Bluetooth transceiver. In this example, the front end may include an analog to digital converter (ADC), and the gain may be selected based on a designated threshold of the ADC, which may be a maximum value, and the set transmission power. In various embodiments, the gain parameter may be determined based on equation 2 shown below.

$$G=R-P1 \quad (2)$$

In equation 2, R may be a target signal strength metric for the ADC. Accordingly, R may be a target RSSI value for the ADC. Such a target value may have been previously determined, or determined by an entity, such as a manufacturer. Moreover, P1 may be a total power seen at the input of a low noise amplifier of the Bluetooth transceiver.

Method 600 may perform operation 604 during which a signal strength metric may be determined. As similarly discussed above, a signal strength metric may be a signal strength indicator obtained from one or more sources within a transceiver, such as an RSSI value. Accordingly, during operation 604, an RSSI value may be identified and retrieved. It will be appreciated that any suitable signal strength indicator may be used. Accordingly, while reference to an RSSI value is made, embodiments disclosed herein may be any suitable indicator of signal strength.

Method 600 may perform operation 606 during which an effective signal strength metric may be determined. In some embodiments, the signal strength metric may be computed at the ADC, and may be computed based on equation 2 shown below:

$$S=b+G \quad (2)$$

In equation 2, S may represent the effective signal strength metric, G represents the gain as described above, and b represents a signal strength metric, such as an RSSI value described above. Accordingly, equation 2 may be used to compute an overall representation of an effective signal strength.

Method 600 may perform operation 608 during which an effective noise metric may be determined. In various embodiments, the effective noise metric may be determined by determining a leakage in-band noise at the given gain G, and combining it with a quantization noise metric and a thermal noise metric. In one example, a quantization noise metric may be determined by multiplying root mean square (RMS) power (seen at the ADC) and a signal-to-quantization-noise ratio (SQNR), which may be computed by one or more components of a processing device using any suitable SQNR computation equation. Moreover, a thermal noise may be computed based on the RMS power, a current temperature, a bandwidth, and one or more other parameters, such as an impedance value. As similarly discussed above, the thermal noise may be computed by one or more components of a processing device using any suitable thermal noise computation equation. Accordingly, the effective noise metric may be computed based on a combination of multiple different types of noise metrics.

Method 600 may perform operation 610 during which a signal to noise ratio may be determined. Accordingly, the signal to noise ratio (SNR) may be computed by dividing the effective signal strength metric by the effective noise metric. The result of the division may be stored as a computed SNR for the second transceiver.

Method 600 may perform operation 612 during which a coding rate may be determined. In various embodiments, the coding rate is determined based on a comparison of the computed SNR to one or more designated threshold values. More specifically a mapping may be used to map the computed SNR to a particular coding modality or a coding rate. In one example, if the computed SNR is greater than 14 decibels (dB), an uncoded modality is selected, and a PHY layer of the second transceiver, which may be a Bluetooth transceiver, is configured to use an uncoded transmission modality specified by the Bluetooth specification. If the computed SNR is between 9 dB and 14 dB, the PHY layer may be configured to use an S=2 coding rate specified by the Bluetooth specification. If the SNR is between 2 dB and 9 dB, the PHY layer may be configured to use an S=8 coding rate specified by the Bluetooth specification. In this example, the threshold values 9 dB and 14 dB may be stored in a designated mapping that may have been generated by an entity, such as a manufacturer. Moreover, as discussed above, the determined coding rate may be transmitted to one or more peer devices, and the peer devices may be configured to use the new coding rate.

Figure 7:
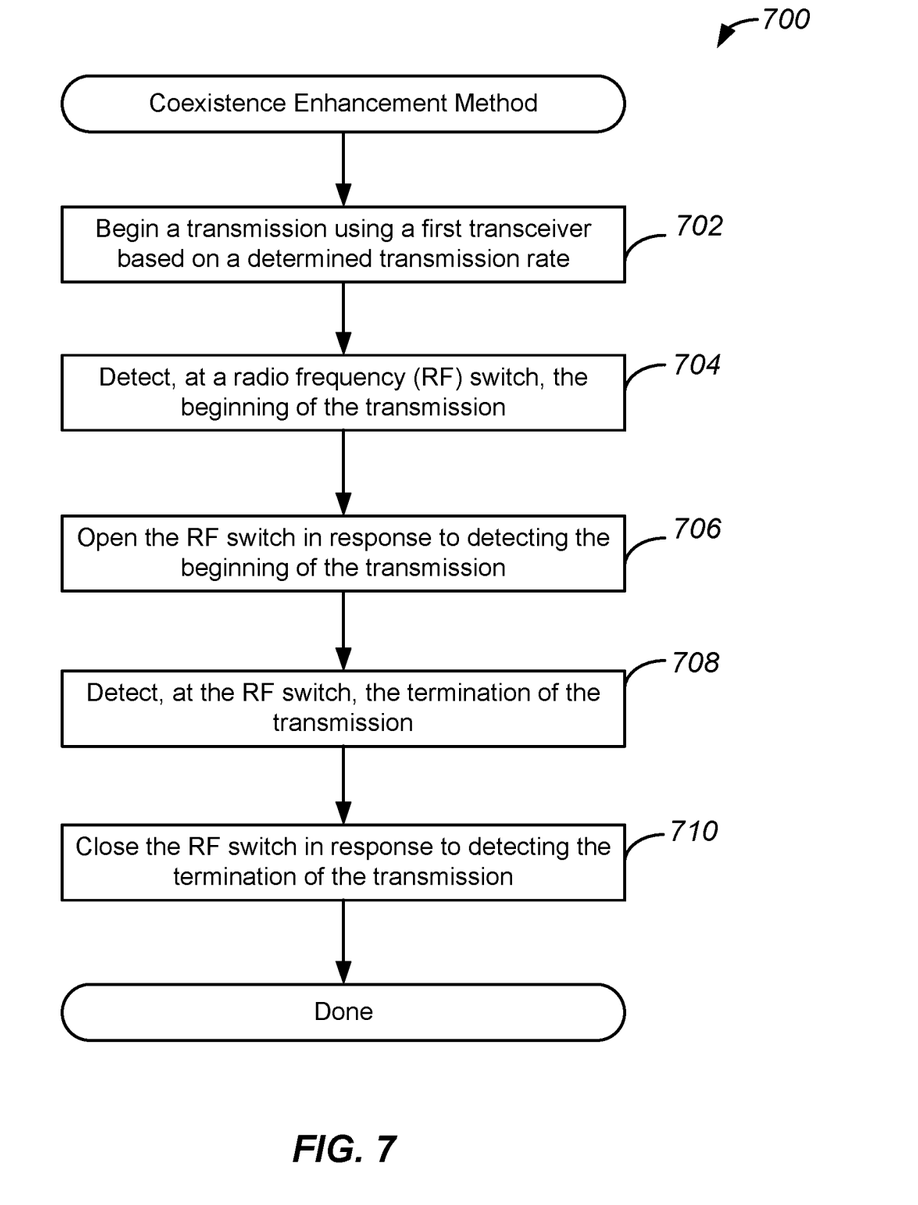
FIG. 7 illustrates an additional example of a method for coexistence enhancement, performed in accordance with some embodiments.

FIG. 7 illustrates an additional example of a method for coexistence enhancement, performed in accordance with some embodiments. As similarly discussed above, one or more switching operations may be performed to improve isolation between collocated transceivers, and reduce leakage from one receiver to another. Accordingly, as will be discussed in greater detail below, an RF circuit may be used to selectively couple and decouple a transceiver from a shared antenna to improve such isolation.

Method 700 may perform operation 702 during which a first transceiver may begin a transmission using a determined transmission rate. As discussed above, a transmission rate may have been determined, and the first transceiver, that may be a Wi-Fi transceiver, may begin one or more data transmission operations to transmit data to a peer device via an antenna.

Method 700 may perform operation 704 during which the beginning of the transmission may be detected at an RF circuit. Accordingly, as similarly discussed above, the RF circuit may detect the beginning of the data transmission, as may be indicated by the de-assertion of a medium access grant signal from the first transceiver.

Method 700 may perform operation 706 during which an RF switch may be opened in response to detecting the beginning of the transmission. Accordingly, an RF switch included in the RF circuit may be opened to decouple a second transceiver, which may be a Bluetooth transceiver, from an antenna. In this way, the second transceiver may be decoupled from the antenna and isolated from transmission operations performed by the first transceiver.

Method 700 may perform operation 708 during which a termination of the transmission may be detected at an RF circuit. Thus, the second transceiver may complete its data transmission, and may once again assert a medium access grant signal. The medium access grant signal may be detected by the RF circuit.

Method 700 may perform operation 710 during which the RF switch may be closed in response to detecting the beginning of the transmission. Accordingly, the RF switch included in the RF circuit may be closed to couple the second transceiver to the antenna. In this way, the second transceiver may be coupled to the antenna so that if may perform transmission operations of its own.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
   determining, using a processing device comprising processing elements, a transmit power for a first transceiver of a wireless device;
   determining, using the processing device, a coding rate for a second transceiver of the wireless device based, at least in part, on the determined transmit power, the first transceiver being collocated with the second transceiver; and
   determining, using the processing device, a transmission rate for the second transceiver based, at least in part, on the determined coding rate.

2. The method of claim 1, wherein the determining of the transmit power further comprises:
   comparing a present transmission power to a plurality of threshold power levels; and
   determining the transmit power based on a result of the comparing.

3. The method of claim 1, wherein the determining of the coding rate further comprises:
   determining a signal to noise ratio (SNR) for the second transceiver;
   comparing the SNR to a plurality of SNR values; and
   determining the coding rate based on a result of the comparing.

4. The method of claim 3, wherein the determining the SNR further comprises:
   determining an effective signal strength metric based on a gain associated with the second transceiver and a signal strength indicator;
   determining an effective noise metric based on a leakage in-band noise metric, a quantization noise metric, and a thermal noise metric; and
   determining the SNR based on a result of dividing the effective signal strength metric by the effective noise metric.

5. The method of claim 3, wherein the plurality of SNR values is stored in a mapping configured to map a given SNR to a coding rate.

6. The method of claim 1 further comprising:
   detecting, using the processing device, a transmission from the first transceiver; and
   performing one or more switching operations for the second transceiver.

7. The method of claim 6, wherein the one or more switching operations further comprise:
   disconnecting the second transceiver from an antenna in response to detecting the transmission from the first transceiver.

8. The method of claim 1 further comprising:
   transmitting the determined coding rate to a peer device.

9. The method of claim 1, wherein the first transceiver is a Wi-Fi transceiver, and wherein the second transceiver is a Bluetooth transceiver.

10. A system comprising:
    a first transceiver configured to be compatible with a first wireless communications protocol;
    a second transceiver collocated with the first transceiver and configured to be compatible with a second wireless communications protocol; and
    processing elements coupled to the first transceiver and the second transceiver, the processing elements being configured to:
    determine a transmit power for the first transceiver;
    determine a coding rate for the second transceiver based, at least in part, on the determined transmit power; and
    determine a transmission rate for the second transceiver based, at least in part, on the determined coding rate.

11. The system of claim 10, wherein the processing elements are further configured to:
    compare a present transmission power to a plurality of threshold power levels; and
    determine the transmit power based on a result of the comparing.

12. The system of claim 10, wherein the processing elements are further configured to:
    determine a signal to noise ratio (SNR) for the second transceiver;
    compare the SNR to a plurality of SNR values; and
    determine the coding rate based on a result of the comparing.

13. The system of claim 12, wherein the processing elements are further configured to:
    determine an effective signal strength metric based on a gain associated with the second transceiver and a signal strength indicator;
    determine an effective noise metric based on a leakage in-band noise metric, a quantization noise metric, and a thermal noise metric; and
    determine the SNR based on a result of dividing the effective signal strength metric by the effective noise metric.

14. The system of claim 10, wherein the processing elements are further configured to:
    detect a transmission from the first transceiver; and
    perform one or more switching operations for the second transceiver, wherein the one or more switching operations comprise disconnecting the second transceiver from an antenna in response to detecting the transmission from the first transceiver.

15. The system of claim 10, wherein the processing elements are further configured to:
    transmit the determined coding rate to a peer device.

16. A device comprising:
    processing elements configured to:
    determine a transmit power for a first transceiver of a wireless device;
    determine a coding rate for a second transceiver of the wireless device based, at least in part, on the determined transmit power, the first transceiver being collocated with the second transceiver; and
    determine a transmission rate for the second transceiver based, at least in part, on the determined coding rate.

17. The device of claim 16, wherein the processing elements are further configured to:
    compare a present transmission power to a plurality of threshold power levels; and
    determine the transmit power based on a result of the comparing.

18. The device of claim 16, wherein the processing elements are further configured to:
- determine a signal to noise ratio (SNR) for the second transceiver;
- compare the SNR to a plurality of SNR values; and
- determine the coding rate based on a result of the comparing.

19. The device of claim 18, wherein the processing elements are further configured to:
- determine an effective signal strength metric based on a gain associated with the second transceiver and a signal strength indicator;
- determine an effective noise metric based on a leakage in-band noise metric, a quantization noise metric, and a thermal noise metric; and
- determine the SNR based on a result of dividing the effective signal strength metric by the effective noise metric.

20. The device of claim 16, wherein the processing elements are further configured to:
- detect a transmission from the first transceiver; and
- perform one or more switching operations for the second transceiver, wherein the one or more switching operations comprise disconnecting the second transceiver from an antenna in response to detecting the transmission from the first transceiver.

* * * * *